(12) United States Patent
Blauvelt

(10) Patent No.: US 10,177,854 B2
(45) Date of Patent: Jan. 8, 2019

(54) MODULATED OPTICAL SOURCE AND METHODS OF ITS OPERATION

(71) Applicant: EMCORE Corporation, Alhambra, CA (US)

(72) Inventor: Henry A. Blauvelt, San Marino, CA (US)

(73) Assignee: EMCORE CORPORATION, Alhambra, CA (US)

( * ) Notice: Subject to any disclaimer, the term of this patent is extended or adjusted under 35 U.S.C. 154(b) by 0 days.

(21) Appl. No.: 15/464,302

(22) Filed: Mar. 20, 2017

(65) Prior Publication Data

US 2018/0269981 A1 Sep. 20, 2018

(51) Int. Cl.
*H04B 10/04* (2006.01)
*H04B 10/548* (2013.01)
*H04B 10/50* (2013.01)

(52) U.S. Cl.
CPC ......... *H04B 10/548* (2013.01); *H04B 10/505* (2013.01)

(58) Field of Classification Search
CPC .............. H04B 10/516; H04B 10/2507; H04B 10/2575; H04B 10/505; H04B 10/50575; H04B 10/50595; H04B 10/5057; H04B 10/572; H04B 10/564; H01S 5/1028; H01S 5/042; H01S 5/0425; H01S 5/0265
USPC ....... 398/183, 186, 187, 188, 192, 193, 194, 398/195, 196, 197, 198, 199, 79, 33, 38,
(Continued)

(56) References Cited

U.S. PATENT DOCUMENTS

| 6,583,910 B1 * | 6/2003 | Satoh ............... H04B 10/07955 359/239 |
| 7,898,464 B1 | 3/2011 | Anderson et al. |
| 8,306,433 B2 | 11/2012 | Kakitsuka et al. |

(Continued)

FOREIGN PATENT DOCUMENTS

| KR | 10-2015-0060423 | 6/2015 |
| WO | WO 2009-001861 | 12/2008 |

OTHER PUBLICATIONS

Co-owned U.S. Appl. No. 15/227,908, filed Aug. 3, 2016 in the names of Blauvelt et al.
(Continued)

*Primary Examiner* — Hanh Phan
(74) *Attorney, Agent, or Firm* — David S. Alavi

(57) ABSTRACT

A control circuit coupled to a light source and an optical modulator receives an electrical modulating signal with alternating active and idle temporal segments; the active temporal segments encode corresponding information. A portion of a source optical signal produced by the light source is transmitted by the modulator as the output optical signal. During idle temporal segments, the light source produces a non-zero source idle power level, and the modulator transmits at a constant idle transmission level. During active temporal segments, the light source produces a source average active power level, the modulator transmits at an average active transmission level that is higher than the idle transmission level, and the output optical signal is modulated in accordance with the electrical modulating signal, so that each active temporal segment of the output optical signal encodes the information of the corresponding active temporal segment of the electrical modulating signal.

32 Claims, 5 Drawing Sheets

(58) Field of Classification Search
USPC .......... 398/25, 135, 136, 137, 138, 139, 158, 398/159; 372/32, 34, 36, 38.02, 50.1
See application file for complete search history.

(56) References Cited

U.S. PATENT DOCUMENTS

| | | |
|---|---|---|
| 9,059,801 B1 | 6/2015 | Blauvelt et al. |
| 9,071,357 B1 | 6/2015 | Shi et al. |
| 9,291,689 B2 | 3/2016 | Popescu |
| 9,306,372 B2 | 4/2016 | Blauvelt et al. |
| 9,306,672 B2 | 4/2016 | Blauvelt et al. |
| 9,312,963 B2 | 4/2016 | Kim et al. |
| 9,438,007 B2 | 9/2016 | Blauvelt et al. |
| 9,564,733 B2 | 2/2017 | Blauvelt et al. |
| 9,564,734 B2 | 2/2017 | Blauvelt et al. |
| 2002/0097941 A1 | 7/2002 | Forrest et al. |
| 2002/0131466 A1 | 9/2002 | Salvatore et al. |
| 2005/0018732 A1 | 1/2005 | Bond et al. |
| 2007/0116398 A1 | 5/2007 | Pan et al. |
| 2014/0010530 A1* | 1/2014 | Goebuchi .......... H04B 10/5057 398/25 |
| 2018/0041006 A1 | 2/2018 | Blauvelt et al. |

OTHER PUBLICATIONS

International Search Report dated Jun. 14, 2018 in co-owned counterpart App No. PCT/US2018/019607.

\* cited by examiner

MODULATED OPTICAL SOURCE AND METHODS OF ITS OPERATION

FIELD OF THE INVENTION

The field of the present invention relates to modulated optical sources. In particular, apparatus and methods are described wherein a modulated optical source exhibits (i) reduced optical output power in the absence of an information-carrying electrical modulation signal and (ii) reduced optical frequency shift upon increasing optical output power in response to receiving an information-carrying electrical modulation signal.

BACKGROUND

A few examples of modulated optical sources are disclosed in:
- U.S. Pub. No. 2002/0097941 entitled "Asymmetric waveguide electroabsorption-modulated laser" published Jul. 25, 2002 in the names of Forrest et al;
- U.S. Pub. No. 2002/0131466 entitled "Electroabsorption modulated laser" published Sep. 19, 2002 in the names of Salvatore et al;
- U.S. Pub. No. 2005/0018732 entitled "Uncooled and high temperature long reach transmitters, and high power short reach transmitters" published Jan. 27, 2005 in the names of Bond et al;
- U.S. Pub. No. 2007/0116398 entitled "High speed and low loss GeSi/Si electroabsorption light modulator and method of fabrication using selective growth" published May 24, 2007 in the names of Pan et al;
- U.S. Pat. No. 9,438,007 entitled "Optical modulator" issued Sep. 6, 2016 to Blauvelt et al;
- U.S. Pat. No. 9,564,734 entitled "Method of fabricating and operating an optical modulator" issued Feb. 7, 2017 to Blauvelt et al; and
- U.S. Pat. No. 9,564,733 entitled "Method of fabricating and operating an optical modulator" issued Feb. 7, 2017 to Blauvelt et al.

Each of the patents and publications listed above is incorporated by reference as if fully set forth herein.

SUMMARY

An inventive modulated optical source comprises a light source, an optical modulator, and a control circuit operatively coupled to the light source and the optical modulator. The control circuit receives an electrical modulating signal that includes alternating active and idle temporal segments; each one of the active temporal segments of the electrical modulating signal encodes corresponding information. The optical source produces, in response to the electrical modulating signal, an output optical signal that includes alternating active and idle temporal segments corresponding to the active and idle temporal segments of the electrical modulating signal. At least a portion of a source optical signal produced by the light source is received by the optical modulator, and the output optical signal comprises one or more portions of the source optical signal that are transmitted by the modulator. During each idle temporal segment, the light source produces the source optical signal at a non-zero source idle power level, and the optical modulator transmits the source optical signal at a substantially constant idle transmission level. During each active temporal segment, the light source produces the source optical signal at a source average active power level, and the optical modulator transmits the source optical signal at an average active transmission level that is higher than the idle transmission level. During each active temporal segment, the output optical signal is modulated in accordance with the electrical modulating signal, so that each active temporal segment of the output optical signal encodes the information of the corresponding active temporal segment of the electrical modulating signal.

In some examples, the optical modulator transmits the source optical signal during each active temporal segment at a substantially constant active transmission level that is about equal to the average active transmission level, and the electrical modulation signal causes modulation of the source optical signal. In other examples, the light source produces the source optical signal during each active temporal segment at a substantially constant source active power level that is about equal to the source average active power level, and the electrical modulation signal causes modulation of an active transmission level of the optical modulator.

A method for operating an inventive modulated optical source comprises: (A) receiving at the control circuit the electrical modulating signal that includes the alternating active and idle temporal segments, wherein each one of the active segments of the electrical modulating signal encodes the corresponding information; and (B) producing, using the modulated optical source, in response to the electrical modulating signal, the optical output signal that includes the alternating active and idle temporal segments corresponding to the active and idle temporal segments of the electrical modulating signal, wherein each active temporal segment of the optical output signal encodes the information of the corresponding active temporal segment of the electrical modulating signal.

Objects and advantages pertaining to modulated optical sources may become apparent upon referring to the example embodiments illustrated in the drawings and disclosed in the following written description or appended claims, and shall fall within the scope of the present disclosure or appended claims.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The embodiments depicted are shown only schematically; all features may not be shown in full detail or in proper proportion, certain features or structures may be exaggerated relative to others for clarity, and the drawings should not be regarded as being to scale unless specifically indicated as such. The embodiments shown are only examples; they should not be construed as limiting the scope of the present disclosure or appended claims.

DETAILED DESCRIPTION OF EMBODIMENTS

Figure 1:
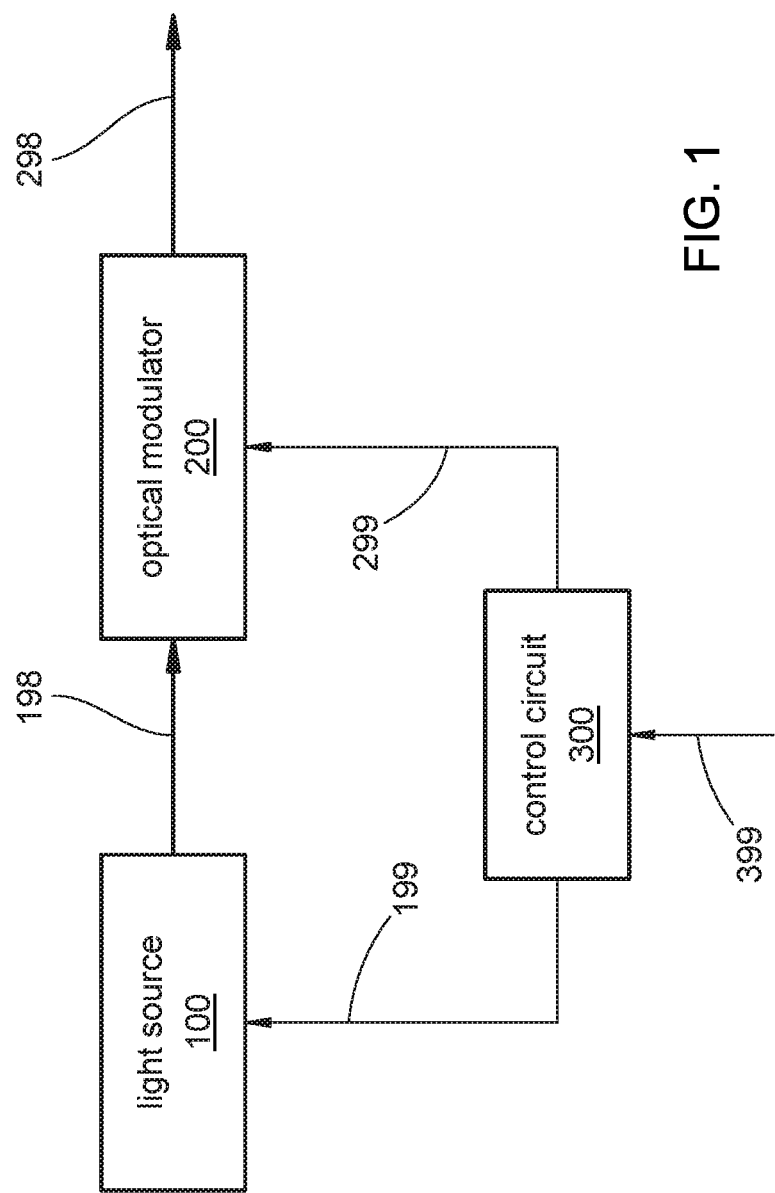
FIG. 1 is a schematic block diagram of a light source, an optical modulator, and a control circuit.

FIG. 1 is a schematic block diagram of an inventive modulated optical source comprising a light source 100, an optical modulator 200, and a control circuit 300 operatively coupled to the light source 100 and the optical modulator 200. The light source 100 can be of any suitable type or arrangement; the light source 100 often comprises a semiconductor laser, e.g., a distributed feedback (DFB) laser formed on a waveguide region of a semiconductor substrate. The optical modulator 200 can be of any suitable type or arrangement; the optical modulator 200 often comprises semiconductor device that includes waveguide structure with a modulator active region, often integrally formed on the same semiconductor substrate as the light source 100. Other types or arrangements of the light source 100 and the optical modulator 200 are described further below.

Figure 2A:
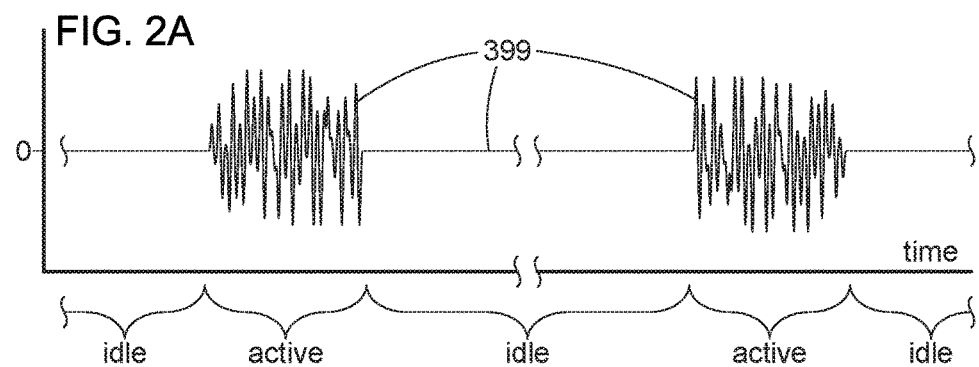
FIGS. 2A through 2D are example temporal waveforms of an electrical modulating signal (FIG. 2A), a source optical signal (FIG. 2B), modulated optical transmission of the optical modulator (FIG. 2C), and an output optical signal (FIG. 2D).
Figure 2B:
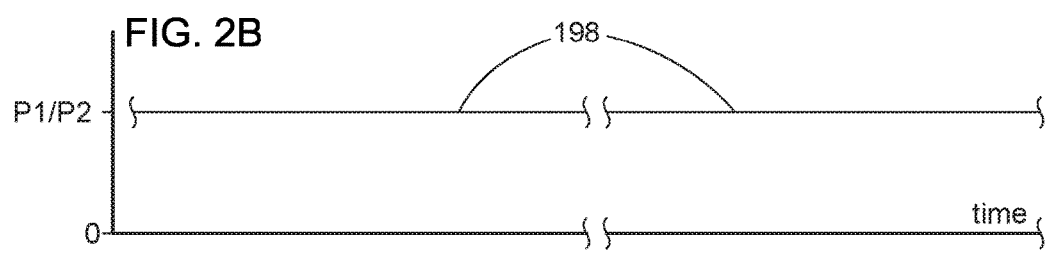
Figure 2C:
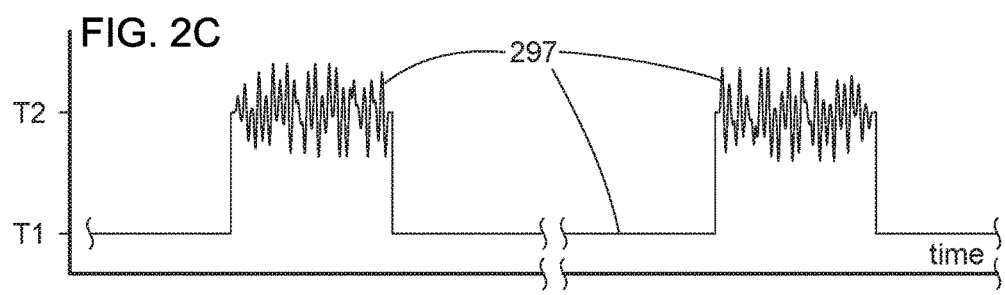
Figure 2D:
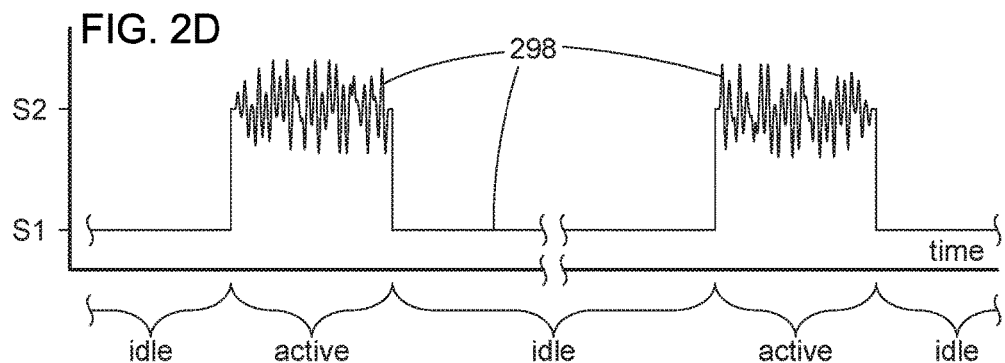
Figure 3A:
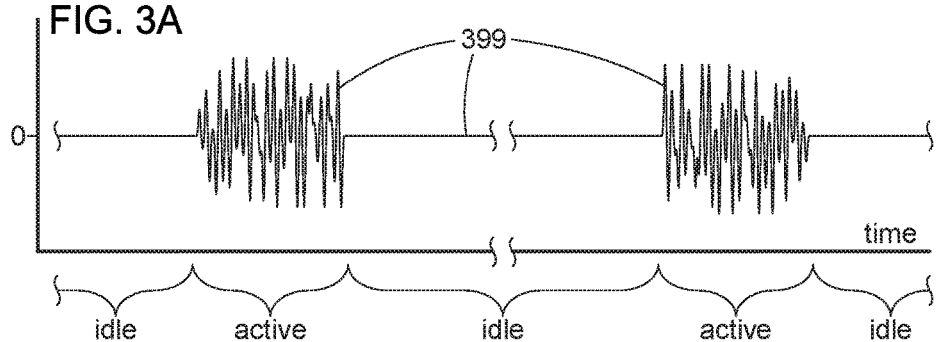
FIGS. 3A through 3D are example temporal waveforms of an electrical modulating signal (FIG. 3A), a modulated source optical signal (FIG. 3B), optical transmission of the optical modulator (FIG. 3C), and an output optical signal (FIG. 3D).
Figure 3B:
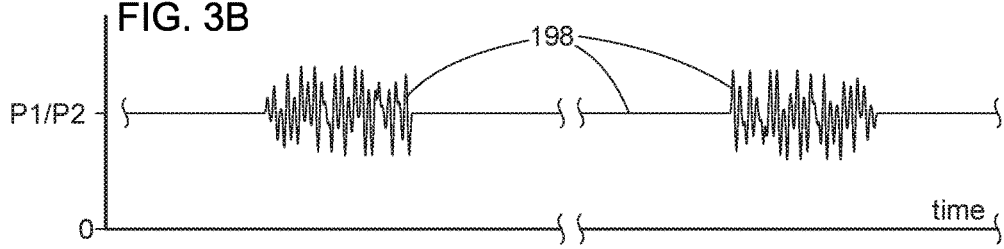
Figure 3C:
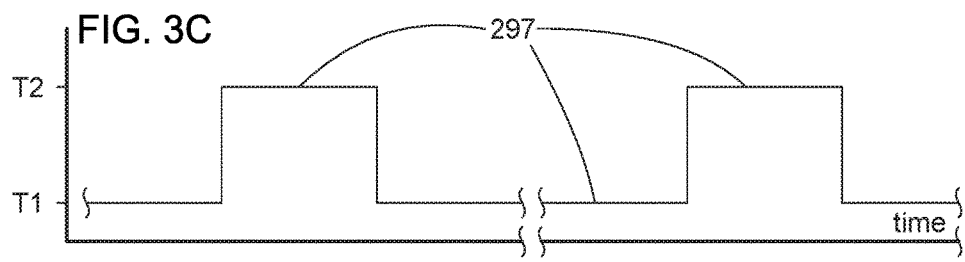
Figure 3D:
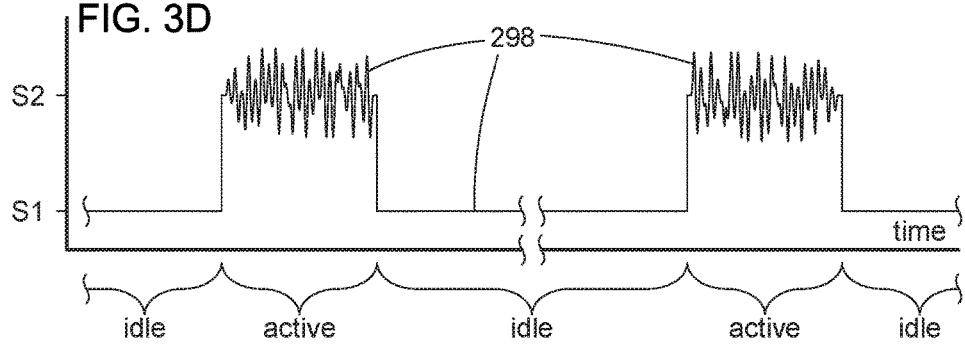

The control circuit 300 receives an electrical modulating signal 399 that includes alternating active and idle temporal segments; example temporal waveforms for the electrical modulating signal 399 are shown in FIGS. 2A and 3A. Such waveforms can arise, e.g., when the modulated laser source is employed only intermittently to transmit information in relatively short bursts. The information is encoded according to any suitable encoding scheme onto the active temporal segments of the electrical modulating signal 399. The idle temporal segments do not encode information, and during the idle temporal segments the electrical modulating signal 399 typically remains at a substantially constant level, usually about zero. In a common scenario, the information is encoded, onto each corresponding active temporal segment of the electrical modulating signal 399, only within a specified modulation frequency range. In some examples, the specified modulation frequency can range from about 5 MHz to about 42 MHz, to about 85 MHz, or to about 200 MHz (i.e., to about $2.0 \times 10^8$ Hz); such modulation frequencies, or signals modulated at those frequencies, may be referred to hereafter as RF modulation or RF signals. The purpose of the modulated optical source is to produce, in response to the electrical modulating signal 399, an output optical signal 298 that includes alternating active and idle temporal segments corresponding to the active and idle temporal segments of the electrical modulating signal 399. The output optical signal 298 can be characterized by an output optical frequency (i.e., a center frequency) and an output optical spectral width (i.e., typically expressed as full-width-at-half-maximum-intensity or FWHM). Example temporal waveforms for the output optical signal 298 are shown in FIGS. 2D and 3D. The output optical signal 298 is modulated in accordance with the electrical modulating signal 399, so that each active temporal segment of the output optical signal 298 encodes the information of the corresponding active temporal segment of the electrical modulating signal 399. A modulation ratio of each active temporal segment of the output optical signal 298 typically can be between about 20.% and about 50.%; other suitable modulation ratios can be employed, e.g., between about 10.% and about 90.%. Note that the modulation ratio typically is defined as half the difference between the maximum and minimum modulated signal power levels divided by the average modulated signal power level.

Figure 5:
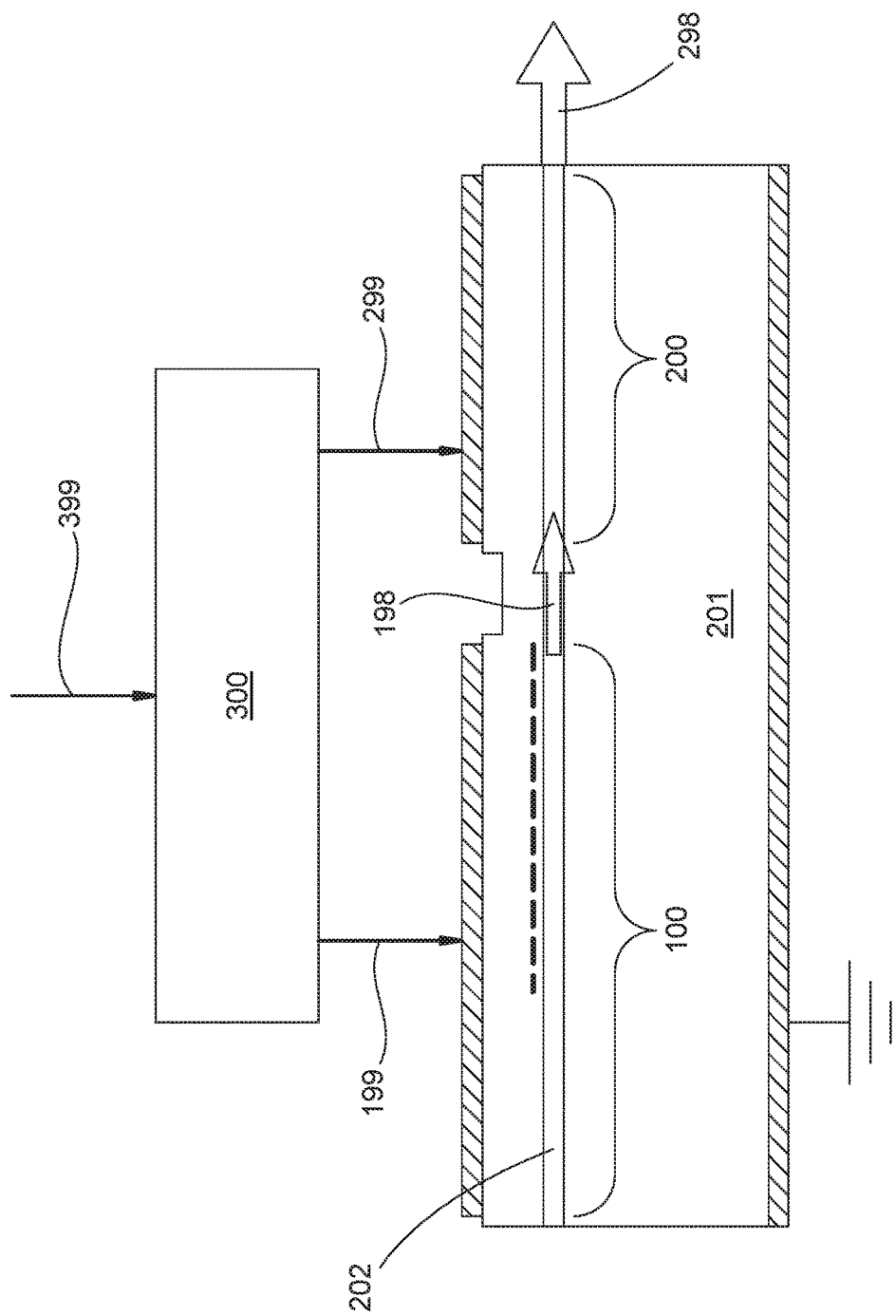
FIG. 5 illustrates schematically an example of a modulated optical source with a light source and an optical modulator on a common semiconductor substrate.

The light source 100 and the optical modulator 200 are arranged and so that at least a portion of a source optical signal 198 produced by the light source 100 is received by the optical modulator 200; the output optical signal 298 comprises one or more portions of the source optical signal 198 that are transmitted by the optical modulator 200. In examples wherein the light source 100 and the optical modulator 200 are integrated onto a common semiconductor substrate 201, the light source 100 and the optical modulator 200 comprise different segments of a common optical waveguide structure 202 formed on the substrate 201 (as in the example of FIG. 5); that arrangement enables the source optical signal 198 to propagate along the waveguide structure from the light source 100 into the optical modulator 200. Other arrangements for coupling the light source 100 and the optical modulator 200 to convey the source optical signal 198 to the optical modulator 200 can be employed, e.g., end-coupling of discrete waveguide-based light source and modulator, coupling via a fiber-optic link, or coupling via free-space propagation.

The control circuit 300 applies a source control signal 199 to the light source 100 that causes the light source 100 to produce the source optical signal 198. Although shown in the schematic diagram of FIG. 1 as a single connection, the control circuit 300 and the light source 100 can be connected in any suitable way with any needed or desired number of one or more electrically conductive links (e.g., one conductive lead for a DC drive current and a second conductive lead for a RF modulation current; other suitable arrangements can be employed). During each idle temporal segment, the control circuit 300 causes the light source 100 to produce the source optical signal 198 at a non-zero source idle power level (labelled P1 in FIGS. 2B and 3B); in some examples the non-zero source idle power level is substantially constant. During each active temporal segment, the control circuit 300 causes the light source 100 to produce the source optical signal 198 at a source average active power level (labelled P2 in FIGS. 2B and 3B). In some examples, the idle and average active source power levels (e.g., P1 and P2 in the examples shown) are about equal to each other; in other examples, those source power levels can differ.

A common arrangement is an optical network with multiple modulated sources transmitting simultaneously at nominally differing optical frequencies; those optical frequencies typically are not well controlled and can drift in unpredictable ways (e.g., in response to ambient temperature variation with time that differs from one optical source to the next, or due to optical frequency dependence on optical power or electrical drive current). Optical beat interference (OBI) occurs when two modulated light sources operate at corresponding optical output frequencies that are too close to each other or coincide (i.e., when two sources undergo a "frequency collision"), intermittently or over prolonged time intervals. The OBI results in distortions of the interfering output optical signals that prevent transmission of the information encoded on one or both of those interfering signals. Such frequency collisions can occur in several ways, and differing countermeasures can be implemented for reducing the likelihood or severity of OBI arising from those frequency collisions.

Many light sources, including semiconductor lasers, exhibit relatively large optical frequency excursions upon activation or changes in output power (e.g., a III-V semiconductor DFB laser on an InP substrate operating at a wavelength of about 1600 nm, i.e., an optical frequency of about 187.5 THz, can shift by 10 GHz or more upon turn-on). In an optical network with multiple modulated sources transmitting simultaneously, those optical frequency excursions typically are large enough to cause optical beat interference (OBI) between two modulated sources whose frequencies drift over each other. By keeping the light source 100 of each modulated optical source operating to produce a sufficiently large non-zero source idle power level during the idle temporal segments (instead of, e.g., turning the light source 100 off), those turn-on-related frequency excursions can be reduced or even substantially eliminated. In examples wherein a laser is employed as the light source 100, the source idle power level typically is at a level sufficiently high that the source optical signal 198 comprises laser light (in addition to any spontaneous emission that might be present). Minimal optical frequency excursion can occur in some examples when the source idle power level is about equal to the source average active power level (e.g., when P1=P2 as in FIG. 2B or 3B). In other examples, a maximum acceptable difference, between the source idle power level P1 and the source average active power level P2, can be selected based on the frequency-versus-power characteristics of the light source 100 and the maximum acceptable frequency excursion in a given use environment. In some examples, the modulated optical source can be arranged so that, upon a transition from an idle temporal period to an active temporal period, the optical frequency of the output optical signal 298 varies by less than about 2.0 GHz, by less than about 1.0 GHz, by less than about 0.5 GHz, or less than about 0.20 GHz, or less than about 0.10 GHz. In some examples, variation of the output optical signal frequency can arise primarily from modulation-induced chirp of the output optical signal 298.

The control circuit 300 applies a modulator control signal 299 to the optical modulator 200 that alters transmission of the source optical signal 198 through the optical modulator 200 to produce the output optical signal 298. Although shown in the schematic diagram of FIG. 1 as a single connection, the control circuit 300 and the optical modulator 200 can be connected in any suitable way with any needed or desired number of one or more electrically conductive links (e.g., one conductive lead for a DC bias or current and a second conductive lead for a RF modulation signal; other suitable arrangements can be employed). During each idle temporal segment, the control circuit 300 causes the optical modulator 200 to transmit the source optical signal 198 at a substantially constant idle transmission level (labelled T1 in FIGS. 2C and 3C). During each active temporal segment, the control circuit 300 causes the optical modulator 200 to transmit the source optical signal 198 at an average active transmission level (labelled T2 in FIGS. 2C and 3C). The average active transmission level is higher than the idle transmission level, typically several orders of magnitude higher. In some examples, the idle transmission level is more than about 30. dB lower than the average active transmission level; in some examples, the idle transmission level is more than about 35. dB lower than the average active transmission level; in some examples, the idle transmission level is more than about 40. dB lower than the average active transmission level; in some examples, the idle transmission level is more than about 45. dB lower than the average active transmission level; in some examples, the idle transmission level is more than about 50. dB lower than the average active transmission level.

The reduction in transmission of the source optical signal 198 during the idle temporal segments enables the light source 100 to remain active and emitting the source optical signal 198 at the source idle power level while reducing leakage of that idle power into a common optical network. Excessive leakage of the idle portion of the source optical signal 198 could cause undesirable interference with other optical signals propagating through the network. Suppression of transmission of the source optical signal 198 during the idle temporal segments enables the light source 100 to remain active during the idle temporal segments (at a sufficiently high source idle power level—see above), thereby avoiding undesirable optical frequency shifts at the beginning of each active temporal segment and decreasing the likelihood of OBI between multiple modulated optical sources on the common optical network.

However, in examples wherein the light source 100 is a laser and the source optical signal 198 includes laser light during the idle temporal segments, the output optical signal 298 (i.e., the fraction of the source optical signal 198 that leaks through the optical modulator 200 during the idle temporal segments) typically has an output spectral width that is relatively narrow (e.g., a few MHz FWHM). Any OBI that might occur between a first modulated optical source (during its idle temporal segment) and a second modulated optical source (during one of its active temporal segments) can be sufficiently severe so as to prevent transmission of information encoded on the output optical signal of the second source. In some examples, the likelihood or severity of such so-called idle/active OBI can be reduced by further reducing the idle transmission level of the optical modulator 200, e.g., so that the idle transmission level is more than about 50. dB lower than the average active transmission level. Instead, or in addition, in some examples the likelihood or severity of idle/active OBI can be reduced by reducing the spectral density of the output optical signal 298 during idle temporal segments. In some examples, such reduction of spectral density can be readily achieved by using the control circuit 100 to apply a dithering signal to the light source 100 during each idle temporal segment. That dithering signal causes the output optical spectral width to broaden during each idle temporal segment relative to the output optical spectral width during each active temporal period (when there is no dithering signal applied). The increased output spectral width correspondingly reduces the spectral density of the output optical signal 298 during each idle temporal segment, thereby also reducing the likelihood or severity of idle/active OBI with another modulated optical source. In some examples, the control circuit 100 is arranged so that the dithering signal oscillates at a dithering frequency between about 1.0 MHz and about 5 MHz; other suitable dithering frequencies can be employed. In some examples, the control circuit 100 is arranged so that the dithering signal results in the output optical spectral width being greater than about 100 MHz FWHM (i.e., greater than about $1.0 \times 10^8$ MHz), greater than about 200 MHz FWHM (i.e., greater than about $2.0 \times 10^8$ MHz), greater than about 500 MHz FWHM (i.e., greater than about $5. \times 10^8$ MHz), or greater than about 1.0 GHz FWHM.

In some examples (e.g., a III-V semiconductor-based modulated laser source operating as an upstream transmitter in a passive optical network with other, similar modulated laser sources, in a wavelength range from about 1200 nm to about 1700 nm), the source idle power level (P1), the source average active power level (P2), the idle transmission level (T1), and the average active transmission level (T2) result in (i) an average idle power level of the output optical signal (labelled S1 in FIGS. 2D and 3D) during each idle temporal segment that is less than about −30. dBm, and (ii) an average active power level of the output optical signal (labelled S2 in FIGS. 2D and 3D) during each active temporal segment that is greater than about 0. dBm. In some of those examples, the average idle power level is less than about −37. dBm, and the average active power level is greater than about 3. dBm. In some of those examples, a III-V semiconductor-based modulator having an active waveguide region greater than about 200 or 250 μm in length has been observed to provide sufficient attenuation of transmission through the optical modulator 200. Typical III-V semiconductor-based lasers and modulators can include various suitable III-V semiconductor materials (e.g., InGaAsP, InAlGaAs, and so forth) in various suitable structural arrangements (e.g., waveguide structures, multiple quantum well structures, active regions, passive regions, and so forth) on suitable III-V semiconductor substrates (e.g., suitably doped InP). Other suitable semiconductor-based light sources 100 or optical modulators 200 can be employed.

Figure 4:
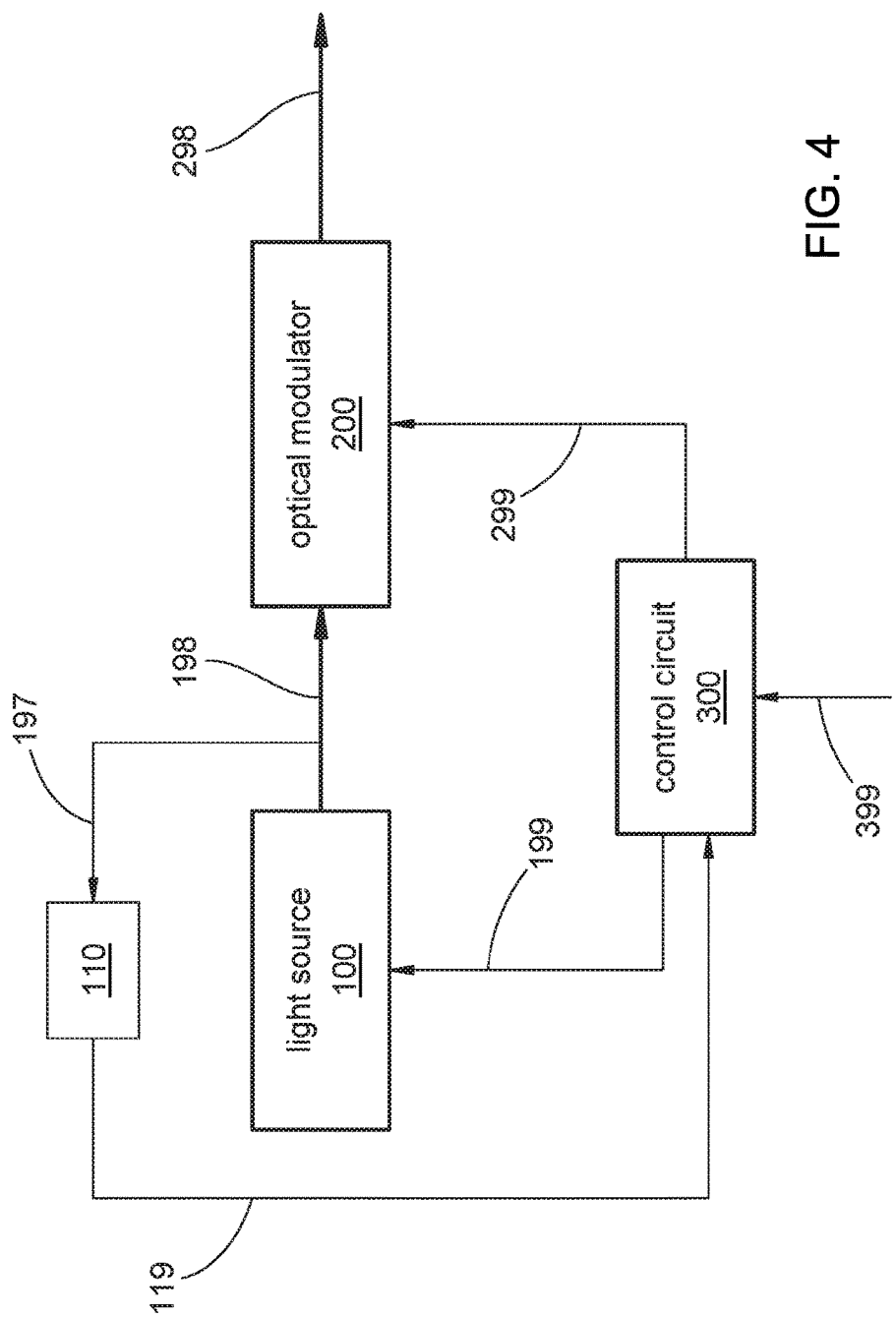
FIG. 4 is a schematic block diagram of a light source including a monitor photodetector, an optical modulator, and a control circuit.

A variant of an inventive modulated optical source is illustrated in the schematic block diagram of FIG. 4. A monitor optical signal 197 is split off from the source optical signal 198 and directed to a monitor photodetector 110 (typically a photodiode; any suitable type of photodetector can be employed). The monitor photodetector 110 produces from the monitor optical signal 197 a monitor electrical signal 119 that is transmitted to the control circuit 300. The control circuit 300 includes one or more portions (e.g., a feedback circuit or other suitable circuit arrangement) that controls the source idle power level or the source average active power level (or both) in response to the monitor electrical signal 119. That control typically maintains a substantially constant level of the monitor electrical signal 197, and therefore indirectly maintains substantial constancy of the source idle and average active power levels.

In some examples, the optical modulator 200 imparts the modulation of the electrical modulating signal 399 onto the active temporal segments of the output optical signal 298. The source control signal 199 provided by the control circuit 300 (including at least a portion dependent on the monitor electrical signal 119, if present) causes the light source 100 to produce the source optical signal 198 at a substantially constant source active power level during each active temporal segment. The substantially constant source active power level is equal to the source average active power level, and often substantially equal to the source idle power level (e.g., as in FIG. 2B, with P1=P2). The modulator control signal 299 includes portions of the electrical modulating signal 399 (or signals derived therefrom), so that, during each active temporal segment, an active transmission level of the optical modulator 200 is modulated in accordance with the electrical modulating signal 399 (e.g., as in FIG. 2C). As a result, each active segment of the optical output signal 298 encodes the information of the corresponding active temporal segment of the electrical modulating signal 399 (e.g., as in FIG. 2D). The optical modulator 200 therefore provides two distinct functions within the modulated optical source. First (which can be referred to as "shutter" functionality), the optical modulator 200 exhibits reduced transmission of the source optical signal 198 during each idle temporal segment (e.g., T1 in FIG. 2C), to reduce the idle output signal power level (e.g., to S1 in FIG. 2D), and exhibits increased average transmission of the source optical signal 198 during each active temporal segment (e.g., T2 in FIG. 2C), to increase the average active output signal power level (e.g., to S2 in FIG. 2D). Second (which can be referred to as "modulator" functionality), during each active temporal segment, the optical modulator 200 imparts modulation onto the output optical signal 298 (e.g., as in FIG. 2D) that encodes the information encoded by the corresponding active temporal segment of the modulating electrical signal 399. In some examples, the entire modulator control signal 299 is applied to the optical modulator 200 by a single electrical conductive element; in other examples, portions of the modulator control signal 299 that affect average transmission of the optical modulator 200 can be applied by electrically conductive elements separate from those that apply portions of the electrical modulating signal 399.

In some examples, the light source 100 imparts the modulation of the electrical modulating signal 399 onto the active temporal segments of the output optical signal 298. The source control signal 199 provided by the control circuit 300 (including at least a portion dependent on the monitor electrical signal 119, if present) causes the light source 100 to produce the source optical signal 198 at a source active average power level (e.g., P2 in FIG. 3B; typically P1=P2). The source control signal 199 includes portions of the electrical modulating signal 399 (or signals derived therefrom), so that, during each active temporal segment, an active power level of the light source 100 is modulated in accordance with the electrical modulating signal 399 (e.g., as in FIG. 3B). As a result, each active segment of the source optical signal 198 encodes the information of the corresponding active temporal segment of the electrical modulating signal 399 (e.g., as in FIG. 3B). In other words, in these examples it is the light source 100 that exhibits the "modulator" functionality described in the preceding paragraph. In some examples, the entire source control signal 199 is applied to the light source 100 by a single electrical conductive element; in other examples, portions of the source control signal 199 that affect the average active power level of the light source 100 can be applied by electrically conductive elements separate from those that apply portions of the electrical modulating signal 399. As in the examples described in the preceding paragraph, the optical modulator 200 exhibits the "shutter" functionality. The modulator control signal 299 causes the optical modulator 200 to exhibit reduced transmission of the source optical signal 198 during each idle temporal segment (e.g., T1 in FIG. 3C), to reduce the idle output signal power level (e.g., to S1 in FIG. 3D), and to exhibit increased, substantially constant average transmission of the source optical signal 198 during each active temporal segment (e.g., T2 in FIG. 3C), to increase the average active output signal power level (e.g., to S2 in FIG. 3D).

In the examples described in the preceding paragraph, wherein modulation of the output optical signal is imparted on the source optical signal 198, the light source 100 can comprise a directly modulated semiconductor laser, e.g., a directly modulated DFB laser. Such a directly modulated light source 100 can exhibit some frequency chirp as it is modulated. The amount of such chirp that is tolerable depends on how closely spaced are the optical frequencies of multiple modulated optical sources transmitting on a common optical network. In other examples described in the preceding paragraph, the light source 100 can comprise a source laser and a separate, external source modulator. Suitable examples are described in, e.g., U.S. Pat. No. 9,059,801, U.S. Pat. No. 9,306,372, U.S. Pat. No. 9,306,672, U.S. Pat. No. 9,438,007, U.S. Pat. No. 9,564,733, U.S. Pat. No. 9,564,734, and U.S. non-provisional application Ser. No. 15/227,908, each of which is incorporated by reference as if fully set forth herein. Additional features disclosed in those references (e.g., integration of a laser and a modulator on distinct active regions of a common waveguide, suppression of current leakage between laser and modulator active regions, source wavelength shorter than an estimated gain peak wavelength, suppression of stimulated Brillouin scattering, chirp compensation, and so forth) can be applied to any of the examples disclosed herein as suitable, needed, or desired.

In some examples in which the optical modulator 200 comprises a semiconductor waveguide with a modulator active region, the modulator active region is arranged so as to alter the transmission level of the optical modulator 200, by an electroabsorption effect, in response to voltage applied by the control circuit 300. In some examples, the control circuit 300 applies a negative bias voltage (as at least a portion of the modulator control signal 299) to the modulator active region of the optical modulator 200, so that the optical modulator 200 exhibits the idle transmission level by an electroabsorption effect during the idle temporal segments. In some examples, the control circuit 300 applies a bias voltage (as at least a portion of the modulator control signal 299) to the modulator active region of the optical modulator 200, so that the optical modulator 200 exhibits the average active transmission level by an electroabsorption effect during the active temporal segments. In some of those latter examples, the control circuit 300 applies active temporal segments of the electrical modulating signal 399 (as at least a portion of the modulator control signal 299) to the modulator active region of the optical modulator 200, so that the optical modulator 200 exhibits a modulated active transmission level by an electroabsorption effect during the active temporal segments.

In some examples in which the optical modulator 200 comprises a semiconductor waveguide with a modulator active region, the modulator active region is arranged so as to alter the transmission level of the optical modulator 200, by injection or extraction of charge carriers, in response to current applied by the control circuit 300 (examples are disclosed in the patents incorporated above). In some examples, the control circuit 300 extracts charge carriers (as at least a portion of the modulator control signal 299) from the modulator active region of the optical modulator 200, so that the optical modulator 200 exhibits the idle transmission level during the idle temporal segments. In some examples, the control circuit 300 extracts charge carriers from, or injects charge carriers into, the modulator active region of the optical modulator 200 (as at least a portion of the modulator control signal 299), so that the optical modulator 200 exhibits the average active transmission level during the active temporal segments. In some of those latter examples, the control circuit 300 extracts charge carriers from, or injects charge carriers into, the modulator active region of the optical modulator 200 according to active temporal segments of the electrical modulating signal 399 (as at least a portion of the modulator control signal 299), so that the optical modulator 200 exhibits a modulated active transmission level during the active temporal segments.

In some instances, behavior of the modulator active region of the optical modulator 200 can include a combination of the behaviors described in the preceding two paragraphs. In some examples, the idle transmission level can arise from an electroabsorption effect, while transmission through the optical modulator 200 during the active temporal segments (constant or modulated) can arise from current extraction or injection. A given modulated light source might exhibit differing behaviors based on environmental conditions, e.g., at colder operating temperatures, an electroabsorption effect might predominate, while at warmer operating temperatures, current injection or extraction behavior might predominate.

In some examples in which the light source 100 and the optical modulator 200 comprise corresponding active regions of a common semiconductor waveguide, it has been observed that upon a transition from an idle temporal segment to an active temporal segment, a transient current appears to leak between the laser and modulator active regions, in turn causing a transient shift in the source optical frequency. The control circuit 300 can be arranged to deliver a transient compensating laser current to the laser active region during at least an initial portion of each active temporal segment, in addition to laser current delivered to the laser active region under control of the monitor photodetector signal 119. The transient compensating laser current can be selected to reduce or substantially eliminate the observed transient source laser optical frequency shift.

Despite all of the countermeasures described above, there still will occur instances of two modulated sources transmitting simultaneously on a common optical network undergoing an optical frequency collision. In some examples of a modulated optical source, the control circuit 300 can be arranged to cause, after each active temporal segment, a shift of the source optical frequency before the next active temporal segment (i.e., an optical frequency hop). The hop is in a random direction and of a randomly varying magnitude (so that two colliding optical sources do not hop in unison). The magnitude of each hop should be larger than typical optical frequency variation by the optical source during each transition between idle and active temporal segments. In some examples the optical frequency hop after each active temporal segment can be more than about 1.0 GHz, more than about 2.0 GHz, more than about 5 GHz, more than about 10. GHz (i.e., more than about $1.0 \times 10^{10}$ Hz), or more than about 20. GHz (i.e., more than about $2.0 \times 10^{10}$ Hz). The optical frequency hop can be achieved in any suitable way, e.g., by temperature tuning via heater/cooler or laser bias current.

The control circuit 300 is arranged to detect a transition in the electrical modulating signal 399 from an idle temporal segment to an active temporal segment. In response to such a detection, the control circuit 300 switches, within a specified switch-on time interval, the light source 100 from the idle power level to the active power level and the optical modulator 200 from the idle transmission level to the active transmission level. The specified switch-on time interval should be sufficiently short so that the modulated optical source does not omit from the output optical signal 298 any of the information encoded on the electrical modulating signal 399. The specified switch-on time interval can be less than about 1.0 μs, less than about 0.5 μs, less than about 0.20 μs, less than about 0.10 μs, or less than about 0.05 μs. Detection of the idle-to-active transition can include detecting a signal level of the electrical modulating signal 399, within a specified modulation frequency range (see above), that exceeds a specified switch-on signal threshold.

Similarly, the control circuit 300 can be arranged to detect a transition in the electrical modulating signal 399 from an active temporal segment to an idle temporal segment. In response to such a detection, the control circuit 300 switches, within a specified switch-off time interval, the light source 100 from the active power level to the idle power level and the optical modulator 200 from the active transmission level to the idle transmission level. The specified switch-off time interval need not be as fast as the switch-on interval, but should not be excessively long so as not to launch optical power into the optical network unnecessarily. The specified switch-off time interval can be less than about 5.0 μs, less than about 2.0 μs, less than about 1.0 μs, or less than about 0.5 μs. Detection of the active-to-idle transition can include detecting a signal level, within a specified modulation frequency range (see above), that remains below a specified switch-off signal threshold during a time interval that exceeds a specified switch-off time threshold (to ensure that the active temporal segment has ended). The specified switch-off time threshold can be greater than about 5.0 μs, greater than about 2.0 μs, greater than about 1.0 μs, or greater than about 0.5 μs.

In some examples, the magnitude of the switch-on signal threshold is greater than magnitude of the switch-off signal threshold, thereby introducing a degree of hysteresis into the detection of the idle-to-active and active-to-idle transitions. Such hysteresis can enable reduction of premature detections of active-to-idle transitions without increasing erroneous detections of idle-to-active transitions.

In some examples, to reduce sensitivity to electronic noise that might fall within the specified modulation frequency range, the control circuit 300 can include a variable attenuator for that frequency range. During the idle temporal segments, attenuation of signal in the modulation frequency range is relatively high (e.g., about 20 dB attenuation), so as to protect the modulated optical source from stray electrical signals. Upon detecting an idle-to active transition, the control circuit 300 can reduce or eliminate attenuation in the modulation frequency range, thereby permitting the modulating electrical signal 399 to reach the modulated optical source. Upon detecting an active-to-idle transition, the control circuit 300 can shift the attenuation back to the higher level.

A method for operating any of the examples described above of a modulated optical source comprises: (A) receiving at the control circuit 300 the electrical modulating signal 399 that includes the alternating active and idle temporal segments, wherein each one of the active segments of the electrical modulating signal 399 encodes the corresponding information; and (B) producing, using the modulated optical source, in response to the electrical modulating signal 399, the optical output signal 298 that includes the alternating active and idle temporal segments corresponding to the active and idle temporal segments of the electrical modulating signal 399, wherein each active temporal segment of the optical output signal encodes the information of the corresponding active temporal segment of the electrical modulating signal.

In addition to the preceding, the following examples fall within the scope of the present disclosure or appended claims:

Example 1

A modulated optical source comprising a light source, an optical modulator, and a control circuit operatively coupled to the light source and the optical modulator, wherein: (a) the control circuit is arranged and connected so as to receive an electrical modulating signal that includes alternating active and idle temporal segments, wherein each one of the active temporal segments of the electrical modulating signal encodes corresponding information; (b) the modulated optical source is arranged and connected so as to produce, in response to the electrical modulating signal, an output optical signal (i) that is characterized by an output optical frequency and an output optical spectral width and (ii) that includes alternating active and idle temporal segments corresponding to the active and idle temporal segments of the electrical modulating signal; (c) the light source and the optical modulator are arranged so that at least a portion of a source optical signal produced by the light source is received by the optical modulator, and the output optical signal comprises one or more portions of the source optical signal that are transmitted by the optical modulator; (d) the control circuit is arranged and connected (i) to the light source so as to cause the light source to produce the source optical signal at a non-zero source idle power level during each idle temporal segment, and (ii) to the optical modulator so as to cause the optical modulator to transmit the source optical signal at a substantially constant idle transmission level during each idle temporal segment; (e) the control circuit is arranged and connected (i) to the light source so as to cause the light source to produce the source optical signal at a non-zero source average active power level during each active temporal segment, and (ii) to the optical modulator so as to cause the optical modulator to transmit the source optical signal at an average active transmission level during each active temporal segment, the average active transmission level being higher than the idle transmission level; and (f) the control circuit is arranged and connected to the light source or the optical modulator so as to result in modulation, during each active temporal segment, of the output optical signal in accordance with the electrical modulating signal, so that each active temporal segment of the output optical signal encodes the information of the corresponding active temporal segment of the electrical modulating signal.

Example 2

The modulated optical source of Example 1 wherein the control circuit is arranged so that the information is encoded, onto each corresponding active temporal segment of the electrical modulating signal and the output optical signal, only within a specified modulation frequency range.

Example 3

The modulated optical source of Example 2 wherein the specified modulation frequency range is from about 5 MHz to about 42 MHz, to about 85 MHz, or to about 200 MHz.

Example 4

The modulated optical source of any one of Examples 1 through 3 wherein the idle transmission level is more than about 30. dB lower than the average active transmission level, more than about 35. dB lower than the average active transmission level, more than about 40. dB lower than the average active transmission level, more than about 45. dB lower than the average active transmission level, or more than about 50. dB lower than the average active transmission level.

Example 5

The modulated optical source of any one of Examples 1 through 4 wherein the source idle power level, the source average active power level, the idle transmission level, and the average active transmission level result in (i) an average idle power level of the output optical signal during each idle temporal segment that is less than about −30. dBm, and (ii) an average active power level of the output optical signal during each active temporal segment that is greater than about 0. dBm.

Example 6

The modulated optical source of any one of Examples 1 through 5 wherein the source idle power level, the source average active power level, the idle transmission level, and the average active transmission level result in (i) an average idle power level of the output optical signal during each idle temporal segment that is less than about −37. dBm, and (ii) an average active power level of the output optical signal during each active temporal segment that is greater than about 3. dBm.

Example 7

The modulated optical source of any one of Examples 1 through 6 wherein the source optical signal is characterized by a wavelength within a range from about 1200 nm to about 1700 nm.

Example 8

The modulated optical source of any one of Examples 1 through 7 wherein the modulated optical source is arranged so that, upon a transition from an idle temporal period to an active temporal period, the output optical frequency varies by less than about 2.0 GHz, by less than about 1.0 GHz, by less than about 0.5 GHz, or less than about 0.20 GHz, or less than about 0.10 GHz.

Example 9

The modulated optical source of any one of Examples 1 through 8 wherein the source idle power level is about equal to the source average active power level.

Example 10

The modulated optical source of any one of Examples 1 through 9 wherein the light source includes a monitor photodetector arranged so as to receive a portion of the source optical signal and generate therefrom a monitor electrical signal, and the control circuit is arranged and connected so as to control the source idle power level or the source average active power level in response to the monitor electrical signal.

Example 11

The modulated optical source of any one of Examples 1 through 10 wherein the light source comprises a semiconductor laser.

Example 12

The modulated optical source of any one of Examples 1 through 11 wherein the light source comprises a semiconductor DFB laser.

Example 13

The modulated optical source of any one of Examples 11 or 12 wherein the light source and the control circuit are arranged so that, during each idle temporal segment, the source optical signal includes laser output of the semiconductor laser.

Example 14

The modulated optical source of Example 13 wherein the control circuit is arranged and connected to the light source so as to apply to the light source, during each idle temporal period, a dithering signal that causes the output optical spectral width to broaden relative to the output optical spectral width during each active temporal period.

Example 15

The modulated optical source of Example 14 wherein the control circuit is arranged so that the dithering signal oscillates at a dithering frequency between about 1.0 MHz and about 5 MHz.

Example 16

The modulated optical source of any one of Examples 14 or 15 wherein the control circuit is arranged so that the dithering signal results in the output optical spectral width being greater than about 100 MHz FWHM, greater than about 200 MHz FWHM, greater than about 500 MHz FWHM, or greater than about 1.0 GHz FWHM.

Example 17

The modulated optical source of any one of Examples 1 through 16 wherein a modulation ratio of each active temporal segment of the output optical signal is between about 10.% and about 90.%, or between about 20.% and about 50.%.

Example 18

The modulated optical source of any one of Examples 1 through 17 wherein the control circuit is arranged and connected so as to attenuate, only during each idle temporal segment, one or more portions of the electrical modulating signal that fall within a specified modulation frequency range.

Example 19

The modulated optical source of any one of Examples 1 through 18 wherein: (e') the control circuit is arranged and connected to the light source so as to cause the light source to produce the source optical signal at a substantially constant source active power level during each active temporal segment, the substantially constant source active power level being about equal to the source average active power level; and (f') the control circuit is arranged and connected to the optical modulator so as to result in modulation, during each active temporal segment, of an active transmission level of the optical modulator in accordance with the electrical modulating signal, so that each active segment of the optical output signal encodes the information of the corresponding active temporal segment of the electrical modulating signal.

Example 20

The modulated optical source of any one of Examples 1 through 18 wherein: (e') the control circuit is arranged and connected to the optical modulator so as to cause the optical modulator to transmit the source optical signal at a substantially constant active transmission level during each active temporal segment, the substantially constant active transmission level being about equal to the average active transmission level; and (f') the control circuit is arranged and connected to the light source so as to result in modulation, during each active temporal segment, of the source optical signal in accordance with the electrical modulating signal, so that each active segment of the optical output signal encodes the information of the corresponding active temporal segment of the electrical modulating signal.

Example 21

The modulated optical source of Example 20 wherein the light source comprises a directly modulated semiconductor laser.

Example 22

The modulated optical source of Example 20 wherein the light source comprises an externally modulated semiconductor laser source that includes a source laser and a source modulator.

Example 23

The modulated optical source of any one of Examples 1 through 22 wherein the optical modulator comprises a semiconductor waveguide with a modulator active region, and the modulator active region is arranged so as to alter the transmission level of the optical modulator in response to voltage or current applied by the control circuit.

Example 24

The modulated optical source of Example 23 wherein the control circuit and the modulator active region are arranged so that the optical modulator exhibits the idle transmission level by an electroabsorption effect in response to a negative bias voltage applied by the control circuit to the modulator active region during the idle temporal segments.

Example 25

The modulated optical source of any one of Examples 23 or 24 wherein the control circuit and the modulator active region are arranged so that the optical modulator exhibits the average active transmission level by an electroabsorption effect in response to a bias voltage applied by the control circuit to the modulator active region during the active temporal segments.

Example 26

The modulated optical source of Example 25 wherein the control circuit and the modulator active region are arranged so that the optical modulator exhibits a modulated active transmission level by an electroabsorption effect in response to active temporal segments of the electrical modulating signal applied by the control circuit to the modulator active region during the active temporal segments.

Example 27

The modulated optical source of any one of Examples 23, 25, or 26 wherein the control circuit and the modulator active region are arranged so that the optical modulator exhibits the idle transmission level by extraction of charge carriers from the modulator active region by the control circuit during the idle temporal segments.

Example 28

The modulated optical source of any one of Examples 23, 24, or 27 wherein the control circuit and the active region are arranged so that the optical modulator exhibits the average active transmission level by injection into the modulator active region, or extraction of charge carriers from the modulator active region, by the control circuit during the active temporal segments.

Example 29

The modulated optical source of Example 28 wherein the control circuit and the modulator active region are arranged so that the optical modulator exhibits a modulated active transmission level by injection into the modulator active region, or extraction of charge carriers from the modulator active region, in response to active temporal segments of the electrical modulating signal applied by the control circuit to the modulator active region during the active temporal segments.

Example 30

The modulated optical source of any one of Examples 23 through 29 wherein the source optical signal is characterized by a wavelength that is shorter than an estimated gain peak wavelength of the modulator active region.

Example 31

The modulated optical source of any one of Examples 23 through 30 wherein the light source comprises a laser active region of the semiconductor waveguide.

Example 32

The modulated optical source of Example 31 wherein the control circuit is arranged so as to deliver a compensating laser current to the laser active region during each active temporal segment, in addition to laser current delivered to the laser active region under control of a monitor photodetector signal.

Example 33

The modulated optical source of any one of Examples 1 through 32 wherein the control circuit is arranged and connected so as to cause, after each active temporal segment, a shift of the source optical frequency by more than about 1.0 GHz, by more than about 2.0 GHz, by more than about 5 GHz, by more than about 10. GHz, or by more than about 20. GHz.

Example 34

The modulated optical source of any one of Examples 1 through 33 wherein the control circuit is arranged so as to: (g) detect a transition in the electrical modulating signal from an idle temporal segment to an active temporal segment; and (h) in response to the detection of part (g), switch, within a specified switch-on time interval, the light source from the idle power level to the active power level and the optical modulator from the idle transmission level to the active transmission level.

Example 35

The modulated optical source of Example 34 wherein the specified switch-on time interval is less than about 1.0 μs, less than about 0.5 µs, less than about 0.20 µs, less than about 0.10 µs, or less than about 0.05 µs.

Example 36

The modulated optical source of any one of Examples 34 or 35 wherein the detection of part (g) includes detecting a signal level, within a specified modulation frequency range, that exceeds a specified switch-on signal threshold.

Example 37

The modulated optical source of any one of Examples 1 through 36 wherein the control circuit is arranged so as to: (g) detect a transition in the electrical modulating signal from an active temporal segment to an idle temporal segment; and (h) in response to the detection of part (g), switch, within a specified switch-off time interval, the light source from the active power level to the idle power level and the optical modulator from the active transmission level to the idle transmission level.

Example 38

The modulated optical source of Example 37 wherein the specified switch-off time interval is less than about 5.0 µs, less than about 2.0 µs, less than about 1.0 µs, or less than about 0.5 µs.

Example 39

The modulated optical source of any one of Examples 37 or 38 wherein the detection of part (g) includes detecting a signal level, within a specified modulation frequency range, that remains below a specified switch-off signal threshold during a time interval that exceeds a specified switch-off time threshold.

Example 40

The modulated optical source of Example 39 wherein the specified switch-off time threshold is greater than about 5.0 µs, greater than about 2.0 µs, greater than about 1.0 µs, or greater than about 0.5 µs.

Example 41

The modulated optical source of any one of Examples 1 through 40 wherein the control circuit is arranged so as to: (g) detect a transition in the electrical modulating signal from an idle temporal segment to an active temporal segment, and that detection includes detecting a signal level within a designated modulation frequency range that exceeds a specified switch-on signal threshold; (h) in response to the detection of part (g), switch, within a specified switch-on time interval, the light source from the idle power level to the active power level and the optical modulator from the idle transmission level to the active transmission level; (g') detect a transition in the electrical modulating signal from an active temporal segment to an idle temporal segment, and that detection includes detecting a signal level within the designated modulation frequency range that remains below a specified switch-off signal threshold during a time interval that exceeds a switch-off time threshold, wherein magnitude of the switch-on signal threshold is greater than magnitude of the switch-off signal threshold; and (h') in response to the detection of part (g'), switch, within a specified switch-off time interval, the light source from the active power level to the idle power level and the optical modulator from the active transmission level to the idle transmission level.

Example 42

A method for operating the modulated optical source of any one of Examples 1 through 41, the method comprising: (A) receiving at the control circuit the electrical modulating signal that includes the alternating active and idle temporal segments, wherein each one of the active segments of the electrical modulating signal encodes the corresponding information; and (B) producing, using the modulated optical source, in response to the electrical modulating signal, the optical output signal that includes the alternating active and idle temporal segments corresponding to the active and idle temporal segments of the electrical modulating signal, wherein each active temporal segment of the optical output signal encodes the information of the corresponding active temporal segment of the electrical modulating signal.

It is intended that equivalents of the disclosed example embodiments and methods shall fall within the scope of the present disclosure or appended claims. It is intended that the disclosed example embodiments and methods, and equivalents thereof, may be modified while remaining within the scope of the present disclosure or appended claims.

In the foregoing Detailed Description, various features may be grouped together in several example embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed example embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., a set of features that are neither incompatible nor mutually exclusive) that appear in the present disclosure or the appended claims, including those sets that may not be explicitly disclosed herein. In addition, for purposes of disclosure, each of the appended dependent claims shall be construed as if written in multiple dependent form and dependent upon all preceding claims with which it is not inconsistent. It should be further noted that the scope of the appended claims does not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure and appended claims, the words "comprising," "including," "having," and variants thereof, wherever they appear, shall be construed as open ended terminology, with the same meaning as if the phrase "at least" were appended after each instance thereof, unless explicitly stated otherwise. For purposes of the present disclosure or appended claims, when terms are employed such as "about equal to," "substantially equal to," "greater than about," "less than about," and so forth, in relation to a numerical quantity, standard conventions pertaining to measurement precision and significant digits shall apply, unless a differing interpretation is explicitly set forth. For null quantities described by phrases such as "substantially prevented," "substantially absent," "substantially eliminated," "about equal to zero," "negligible," and so forth, each such phrase shall denote the case wherein the quantity in question has been reduced or diminished to such an extent that, for practical purposes in the context of the intended operation or use of the disclosed or claimed apparatus or method, the overall behavior or performance of the apparatus or method does not differ from that which would have occurred had the null quantity in fact been completely removed, exactly equal to zero, or otherwise exactly nulled.

In the appended claims, any labelling of elements, steps, limitations, or other portions of a claim (e.g., first, second, etc., (a), (b), (c), etc., or (i), (ii), (iii), etc.) is only for purposes of clarity, and shall not be construed as implying any sort of ordering or precedence of the claim portions so labelled. If any such ordering or precedence is intended, it will be explicitly recited in the claim or, in some instances, it will be implicit or inherent based on the specific content of the claim. In the appended claims, if the provisions of 35 USC § 112(f) are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC § 112(f) are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A modulated optical source comprising a light source, an optical modulator, and a control circuit operatively coupled to the light source and the optical modulator, wherein:

(a) the control circuit is arranged and connected so as to receive an electrical modulating signal that includes alternating active and idle temporal segments, wherein each one of the active temporal segments of the electrical modulating signal encodes corresponding information;

(b) the modulated optical source is arranged and connected so as to produce, in response to the electrical modulating signal, an output optical signal (i) that is characterized by an output optical frequency and an output optical spectral width and (ii) that includes alternating active and idle temporal segments corresponding to the active and idle temporal segments of the electrical modulating signal;

(c) the light source and the optical modulator are arranged so that at least a portion of a source optical signal produced by the light source is received by the optical modulator, and the output optical signal comprises one or more portions of the source optical signal that are transmitted by the optical modulator;

(d) the control circuit is arranged and connected (i) to the light source so as to cause the light source to produce the source optical signal at a non-zero source idle power level during each idle temporal segment, and (ii) to the optical modulator so as to cause the optical modulator to transmit the source optical signal at a substantially constant idle transmission level during each idle temporal segment;

(e) the control circuit is arranged and connected (i) to the light source so as to cause the light source to produce the source optical signal at a non-zero source average active power level during each active temporal segment, and (ii) to the optical modulator so as to cause the optical modulator to transmit the source optical signal at an average active transmission level during each active temporal segment, the average active transmission level being higher than the idle transmission level; and (f) the control circuit is arranged and connected to the light source or the optical modulator so as to result in modulation, during each active temporal segment, of the output optical signal in accordance with the electrical modulating signal, so that each active temporal segment of the output optical signal encodes the information of the corresponding active temporal segment of the electrical modulating signal.

2. The modulated optical source of claim 1 wherein the control circuit is arranged so that the information is encoded, onto each corresponding active temporal segment of the electrical modulating signal and the output optical signal, only within a specified modulation frequency range that is from about 5 MHz to about 200 MHz.

3. The modulated optical source of claim 1 wherein the idle transmission level is more than about 30. dB lower than the average active transmission level.

4. The modulated optical source of claim 1 wherein the source idle power level, the source average active power level, the idle transmission level, and the average active transmission level result in (i) an average idle power level of the output optical signal during each idle temporal segment that is less than about −30. dBm, and (ii) an average active power level of the output optical signal during each active temporal segment that is greater than about 0. dBm.

5. The modulated optical source of claim 1 wherein the source idle power level, the source average active power level, the idle transmission level, and the average active transmission level result in (i) an average idle power level of the output optical signal during each idle temporal segment that is less than about −37. dBm, and (ii) an average active power level of the output optical signal during each active temporal segment that is greater than about 3. dBm.

6. The modulated optical source of claim 1 wherein the modulated optical source is arranged so that, upon a transition from an idle temporal period to an active temporal period, the output optical frequency varies by less than about 2.0 GHz.

7. The modulated optical source of claim 1 wherein the source idle power level is about equal to the source average active power level.

8. The modulated optical source of claim 1 wherein the light source includes a monitor photodetector arranged so as to receive a portion of the source optical signal and generate therefrom a monitor electrical signal, and the control circuit is arranged and connected so as to control the source idle power level or the source average active power level in response to the monitor electrical signal.

9. The modulated optical source of claim 1 wherein the light source comprises a semiconductor laser.

10. The modulated optical source of claim 9 wherein the light source and the control circuit are arranged so that, during each idle temporal segment, the source optical signal includes laser output of the semiconductor laser.

11. The modulated optical source of claim 10 wherein the control circuit is arranged and connected to the light source so as to apply to the light source, during each idle temporal period, a dithering signal that causes the output optical spectral width to broaden relative to the output optical spectral width during each active temporal period.

12. The modulated optical source of claim 11 wherein the control circuit is arranged so that the dithering signal oscillates at a dithering frequency between about 1.0 MHz and about 5 MHz.

13. The modulated optical source of claim 11 wherein the control circuit is arranged so that the dithering signal results in the output optical spectral width being greater than about 100 MHz FWHM.

14. The modulated optical source of claim 1 wherein the control circuit is arranged and connected so as to attenuate, only during each idle temporal segment, one or more portions of the electrical modulating signal that fall within a specified modulation frequency range.

15. The modulated optical source of claim 1 wherein:
(e') the control circuit is arranged and connected to the light source so as to cause the light source to produce the source optical signal at a substantially constant source active power level during each active temporal segment, the substantially constant source active power level being about equal to the source average active power level; and
(f') the control circuit is arranged and connected to the optical modulator so as to result in modulation, during each active temporal segment, of an active transmission level of the optical modulator in accordance with the electrical modulating signal, so that each active segment of the optical output signal encodes the information of the corresponding active temporal segment of the electrical modulating signal.

16. The modulated optical source of claim 1 wherein:
(e') the control circuit is arranged and connected to the optical modulator so as to cause the optical modulator to transmit the source optical signal at a substantially constant active transmission level during each active temporal segment, the substantially constant active transmission level being about equal to the average active transmission level; and
(f') the control circuit is arranged and connected to the light source so as to result in modulation, during each active temporal segment, of the source optical signal in accordance with the electrical modulating signal, so that each active segment of the optical output signal encodes the information of the corresponding active temporal segment of the electrical modulating signal.

17. The modulated optical source of claim 16 wherein light source comprises (i) a directly modulated semiconductor laser or (ii) an externally modulated semiconductor laser source that includes a source laser and a source modulator.

18. The modulated optical source of claim 1 wherein the optical modulator comprises a semiconductor waveguide with a modulator active region, and the modulator active region is arranged so as to alter the transmission level of the optical modulator in response to voltage or current applied by the control circuit.

19. The modulated optical source of claim 18 wherein the control circuit and the modulator active region are arranged so that the optical modulator exhibits the idle transmission level by an electroabsorption effect in response to a negative bias voltage applied by the control circuit to the modulator active region during the idle temporal segments.

20. The modulated optical source of claim 18 wherein the control circuit and the modulator active region are arranged so that the optical modulator exhibits the average active transmission level by an electroabsorption effect in response to a bias voltage applied by the control circuit to the modulator active region during the active temporal segments.

21. The modulated optical source of claim 20 wherein the control circuit and the modulator active region are arranged so that the optical modulator exhibits a modulated active transmission level by an electroabsorption effect in response to active temporal segments of the electrical modulating signal applied by the control circuit to the modulator active region during the active temporal segments.

22. The modulated optical source of claim 18 wherein the control circuit and the modulator active region are arranged so that the optical modulator exhibits the idle transmission level by extraction of charge carriers from the modulator active region by the control circuit during the idle temporal segments.

23. The modulated optical source of claim 18 wherein the control circuit and the active region are arranged so that the optical modulator exhibits the average active transmission level by injection into the modulator active region, or extraction of charge carriers from the modulator active region, by the control circuit during the active temporal segments.

24. The modulated optical source of claim 23 wherein the control circuit and the modulator active region are arranged so that the optical modulator exhibits a modulated active transmission level by injection into the modulator active region, or extraction of charge carriers from the modulator active region, in response to active temporal segments of the electrical modulating signal applied by the control circuit to the modulator active region during the active temporal segments.

25. The modulated optical source of claim 18 wherein the light source comprises a laser active region of the semiconductor waveguide.

26. The modulated optical source of claim 25 wherein the control circuit is arranged so as to deliver a compensating laser current to the laser active region during each active temporal segment, in addition to laser current delivered to the laser active region under control of a monitor photodetector signal.

27. The modulated optical source of claim 1 wherein the control circuit is arranged and connected so as to cause, after each active temporal segment, a shift of the source optical frequency by more than about 5 GHz.

28. The modulated optical source of claim 1 wherein the control circuit is arranged so as to:
(g) detect a transition in the electrical modulating signal from an idle temporal segment to an active temporal segment; and (h) in response to the detection of part (g), switch, within a specified switch-on time interval that is less than about 0.5 µs, the light source from the idle power level to the active power level and the optical modulator from the idle transmission level to the active transmission level.

29. The modulated optical source of claim 1 wherein the control circuit is arranged so as to:
   (g) detect a transition in the electrical modulating signal from an active temporal segment to an idle temporal segment; and
   (h) in response to the detection of part (g), switch, within a specified switch-off time interval that is less than about 0.5 µs, the light source from the active power level to the idle power level and the optical modulator from the active transmission level to the idle transmission level.

30. The modulated optical source of claim 29 wherein the detection of part (g) includes detecting a signal level, within a specified modulation frequency range, that remains below a specified switch-off signal threshold during a time interval that exceeds a specified switch-off time threshold that is greater than about 1.0 µs.

31. The modulated optical source of claim 1 wherein the control circuit is arranged so as to:
   (g) detect a transition in the electrical modulating signal from an idle temporal segment to an active temporal segment, and that detection includes detecting a signal level within a designated modulation frequency range that exceeds a specified switch-on signal threshold;
   (h) in response to the detection of part (g), switch, within a specified switch-on time interval, the light source from the idle power level to the active power level and the optical modulator from the idle transmission level to the active transmission level;
   (g') detect a transition in the electrical modulating signal from an active temporal segment to an idle temporal segment, and that detection includes detecting a signal level within the designated modulation frequency range that remains below a specified switch-off signal threshold during a time interval that exceeds a switch-off time threshold, wherein magnitude of the switch-on signal threshold is greater than magnitude of the switch-off signal threshold; and
   (h') in response to the detection of part (g'), switch, within a specified switch-off time interval, the light source from the active power level to the idle power level and the optical modulator from the active transmission level to the idle transmission level.

32. A method for operating a modulated optical source, the method comprising:
   (A) receiving an electrical modulating signal that includes alternating active and idle temporal segments, wherein each one of the active segments of the electrical modulating signal encodes corresponding information; and
   (B) producing, using the modulated optical source, in response to the electrical modulating signal, an optical output signal that includes alternating active and idle temporal segments corresponding to the active and idle temporal segments of the electrical modulating signal, wherein each active temporal segment of the optical output signal encodes the information of the corresponding active temporal segment of the electrical modulating signal, wherein:
(a) the modulated optical source comprises a light source, an optical modulator, and a control circuit operatively coupled to the light source and the optical modulator;
(b) the control circuit is arranged and connected so as to receive the electrical modulating signal;
(c) the modulated optical source is arranged and connected so as to produce, in response to the electrical modulating signal, the output optical signal characterized by an output optical frequency and an output optical spectral width;
(d) the light source and the optical modulator are arranged so that at least a portion of a source optical signal produced by the light source is received by the optical modulator, and the output optical signal comprises one or more portions of the source optical signal that are transmitted by the optical modulator;
(e) the control circuit is arranged and connected (i) to the light source so as to cause the light source to produce the source optical signal at a non-zero source idle power level during each idle temporal segment, and (ii) to the optical modulator so as to cause the optical modulator to transmit the source optical signal at a substantially constant idle transmission level during each idle temporal segment;
(f) the control circuit is arranged and connected (i) to the light source so as to cause the light source to produce the source optical signal at a non-zero source average active power level during each active temporal segment, and (ii) to the optical modulator so as to cause the optical modulator to transmit the source optical signal at an average active transmission level during each active temporal segment, the average active transmission level being higher than the idle transmission level; and
(g) the control circuit is arranged and connected to the light source or the optical modulator so as to result in modulation, during each active temporal segment, of the output optical signal in accordance with the electrical modulating signal, so that each active temporal segment of the output optical signal encodes the information of the corresponding active temporal segment of the electrical modulating signal.

* * * * *